United States Patent
Mironov et al.

[15] 3,697,569
[45] Oct. 10, 1972

[54] METHOD OF PRODUCING 1,3-BIS (HYDROXYARYL) TETRAORGANOSILOXANES

[72] Inventors: Vladimir Florovich Mironov, ulitsa Gubkina, 4 kv. 13; Nikolai Semenovich Fedotov, Sosinskaya ulitsa, 6 kv. 7; Vadim Lvovich Kozlikov, ulitsa Palekhskaya, 118a, kv. 7, all of Moscow, U.S.S.R.

[22] Filed: Feb. 4, 1971

[21] Appl. No.: 112,787

[52] U.S. Cl....260/448.2 B, 260/46.5 Y, 260/448.2 E
[51] Int. Cl..............................................C07f 7/08
[58] Field of Search..................260/448.2 B, 448.2 E

[56] References Cited

UNITED STATES PATENTS

| | | | |
|---|---|---|---|
| 2,611,779 | 9/1952 | Speier | 260/448.2 B X |
| 2,711,417 | 6/1955 | Frisch | 260/448.2 B |
| 2,921,940 | 1/1960 | Ramsden | 260/448.2 B X |
| 3,137,720 | 6/1964 | Cooper | 260/448.2 B |
| 3,576,032 | 4/1971 | Pearce | 260/448.2 B |
| 3,579,467 | 5/1971 | Brown | 260/448.2 B X |

*Primary Examiner*—Tobias E. Levow
*Assistant Examiner*—P. F. Shaver
*Attorney*—Waters, Roditi, Schwartz & Nissen

[57] ABSTRACT

A method producing 1,3 bis-(hydroxyaryl) tetraorganodisiloxanes of the general formula

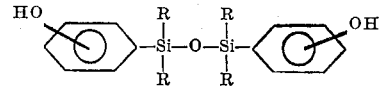

where R is alkyl,
consisting in that a diorganohydrosilyl halophenol ester is reacted with magnesium in an organic solvent medium. Then the solvent is distilled off, the reaction mixture is heated to a temperature of 150°–180° C, is treated with a 10–15% solution of a mineral acid, thus isolating diorganohydroxilyl-substituted phenols of the general formula

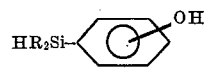

where R is alkyl.

The obtained compounds of the above-mentioned general formula are subjected to hydrolysis in the presence of a catalyst such as powdered copper, powdered nickel, powdered iron, an organic or inorganic base, hydroxide or alcoholate of alkali metals, or are subjected to alcoholysis in the presence of the above-said catalysts followed by hydrolysis. After that condensation of the diorganohydroxysilylphenols is effected under a vacuum at a temperature of 35°–60°C and a residual pressure of 1–2 mm Hg.

The 1,3 bis-(hydroxyaryl) tetraorganodisiloxanes are used for synthesis of polymers having a high terminal stability.

5 Claims, No Drawings

METHOD OF PRODUCING 1,3-BIS (HYDROXYARYL) TETRAORGANOSILOXANES

The present invention relates to carbofunctional diols of the siloxane series which can be used for producing various monomer (chloroformates, carbonates, urethanes) and polymer (polyesters, polyurethanes, polycarbonates, etc.) compounds as well as to a method of producing carbofunctional diols.

Known in the art are carbofunctional diols-1,3 bis-(hydroxylalkyl) tetraorganodisiloxanes having the general formula:

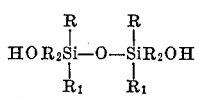

where R and $R_1$ are alkyl or aryl: $R_2$ a bivalent organic radical (cf. French Pat. No. 1598951).

Also known in the art is a method of producing the above-said compounds by reacting organohydrohalogensilanes with unsaturated alcohols in the presence of a tertiary amine followed by polymerization of the obtained alkenyloxydiorganohydrosilanes in the presence of a hydrosilylation catalyst, the obtained mixture of siloxyalkanes being treated with an alkaline solution at boiling and separating the desired product (the same patent).

However, the polymers based on the known carbofunctional diols do not provide for an adequate thermal resistance.

An object of the present invention is to synthesize a new class of carbofunctional diols of the siloxane series to be used as a base for producing polymers having a high thermal stability.

According to this and other objects, the invention consists in that the proposed compounds or 1,3 bis-(hydroxyaryl) tetraorganosiloxanes have the general formula:

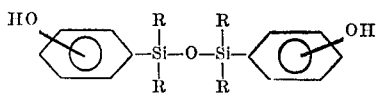

where R is alkyl.

These compounds are used as a base for obtaining polymers having a higher thermal stability than that of the polymers based on the known carbofunctional compounds.

The proposed 1,3 bis-(hydroxyaryl) tetraorganodisiloxanes can be produced by a method, which, according to the invention, consists in that the diorganohydrosilyl halophenol ester is reacted with magnesium in a medium of an organic solvent with subsequent distillation of the solvent, heating of the reaction mixture to a temperature of 150°–180°C, treatment of this mixture with a 10–15 percent solution of a mineral acid, isolation of diorganohydrosilyl-substituted phenols having the general formula

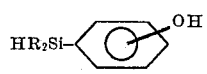

where R is alkyl; thereafter, the obtained compounds of the above formula are subjected to hydrolysis in the presence of a catalyst in the form of a powder of copper, nickel, iron, organic or inorganic base, hydroxide or alcoholate of alkali metals or are subjected to alcoholysis in the presence of the same catalysts with subsequent hydrolysis; then the obtained diorganohydroxysilylphenols are subjected to condensation under a vacuum at a temperature of 35°–60°C and a negative pressure of 1–2 mm Hg. In order to accelerate the condensation process, it is effected in the presence of water absorbing agents.

The diorganohydrosilylphenols halophenol ester can be composed, for example, of dimethylsilyl o- or p-bromophenol ester, diethylsilyl o- or p-chlorophenol ester.

The organic solvent may be composed of tetrahydrofuran, or diethyl ether.

The catalyst of the reaction of hydrolysis or alcoholysis of diorganohydrosilylphenols is composed of powders of copper, nickel, iron, inorganic and organic bases such as ammonia, triethylamine, pyridine, hydroxides and alcoholates of alkali metals such as calcium hydroxide, sodium methylate or acetate.

The water absorbing agents used during the condensation of diorganohydroxsilylphenol may be composed, for example, of phosphorus pentoxide or sulphuric acid.

The proposed method of producing 1,3 bis-(hydroxyaryl) tetraorganodisiloxanes is effected as follows.

Into a three-necked flask equipped with a stirrer, a reflux condenser and a dropping funnel is added magnesium, followed by 0.3–07 ml of dibromomethane and then diorganohydrosilyl halophenol ester in an organic solvent medium is gradually introduced dropwise into the reaction mixture. After that, the solvent is distilled from the reaction mixture and the contents of the flask are heated to a temperature of 150°–180°C for at least 2 hours. The obtained reaction mass is treated with a 10–15 percent solution of a mineral acid, and then an organic solvent. The formed organic layer containing diorganohydrosilyl-substituted phenols having the general formula:

where R is alkyl, and the organic solvent are separated from the water-acid layer. The solvent is distilled from the organic layer, the residue is distilled under a vacuum and the compounds of the above general formula are isolated. The obtained compounds are subjected to hydrolysis followed by the condensation of the produced diorganohydroxysilylphenols or these compounds are subjected to alcoholysis followed by the hydrolysis and condensation of the produced diorganohydroxysilylphenols.

The hydrolysis is effected as follows.

Water and a catalyst are placed into a two-necked flask provided with a dropping funnel and a reflux condenser, then diorganohydrosilylphenol in a medium of an organic solvent is slowly added to the reaction mixture in the flask. The reaction runs with vigorous evolution of hydrogen. After completing the hydrolysis, the reaction mass is filtered out, washed with a solvent, which is then distilled. The condensation of the obtained diorganohydroxisilylphenols is effected under a vacuum at a temperature of 35°-60°C and a negative pressure of 1-2 mm Hg. The condensation can also be effected in the presence of water absorbing agents.

The alcoholysis with subsequent hydrolysis is effected as follows.

Alcohol, for example, methyl, ethyl alcohol or phenol and a catalyst are placed into a two-necked flask provided with a dropping funnel and a reflux condenser and diorganohydrosilylphenol is slowly added to the reaction mixture. The reaction is vigorous and is accompanied by evolution of hydrogen. Then the reaction mass is boiled for 30-40 minutes, the alcohol is distilled off and the residue is distilled under a vacuum, and alkoxydiorganosilylphenol is isolated having the general formula:

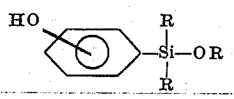

where R is alkyl, $R^1$ is alkyl or aryl.

The obtained compound is placed into a beaker and water heated to 40°-60°C is added thereto with stirring. After cooling the reaction mass, a solid substance or diorganohydroxysilylphenol, having the general formula

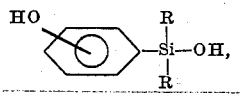

where R is alkyl, precipitates and then is recrystallized. The condensation of the obtained compound is effected at a temperature of 35°-60°C and a negative pressure of 1-2 mm Hg. The condensation can also be effected in the presence of a water absorbing agent. As a result, a transparent viscous liquid is obtained which crystallizes after cooling.

The proposed method can be effected according to the following diagram.

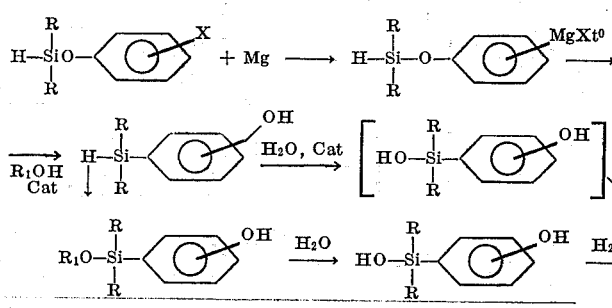

where R is alkyl, R' is alkyl or aryl, X is halogen.

The proposed method is featured by a simple technological process, availability of the stock material, and the possibility of producing final products with a high yield (70-90 percent of the theoretical yield).

The invention will be better understood upon consideration of the following examples of producing 1,3 bis-(hydroxyaryl) tetraorganodisiloxanes.

EXAMPLE 1

5 g of magnesium is placed into a three-necked flask, 0.5 ml of dibromoethane is added into the same flask and slowly added dropwise to the reaction mixture is 46.2 g (0.2 mole) of dimethylhydrosilyl o-bromophenol ester in 100 ml of tetrahydrofuran. After completing the dropwise addition, the solvent is distilled from the reaction mass on an oil bath and the contents of the flask are heated for 3 hours gradually increasing the bath temperature to 170°C. The obtained vitreous mass is treated with 100 ml of 10 percent hydrochloric acid and 100 ml of diethyl ether is added to the mass. The organic layer is separated and is dried over magnesium sulfate. The ester is distilled off and the residue is distilled under a vacuum, thus producing 26.5 g (89 percent) of o-dimethylhydrosilylphenol having a boiling point of 84°-85°C at 4 mm Hg:, $n_D^{20} = 1.5330$; $d_4^{20} = 1.0153$.

2 g of copper powder and 10 ml of water is placed into a two-necked flask and 15.2 g (0.1 mole) of o-dimethylhydrosilylphenol in 15 ml of tetrahydrofuran is added dropwise to the reaction mass over a period of 30-40 minutes. After the end of evolution of hydrogen the reaction mass is filtered out and is washed with 10 ml of tetrahydrofuran. Then the solvent is distilled off and the residue is distilled on a water bath at a temperature of 55°C and a negative pressure of 2 mm Hg to constant weight. After the recrystallization there was produced 13.1 g (82.5 percent) of the desired product having a boiling point of 32°-33.5°C. It consists of 1,3 bis-(o-hydroxyphenyl) tetramethyldisiloxane having the general formula

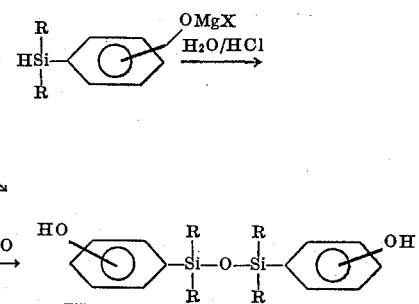

EXAMPLE 2

By using the technique described in Example 1, from 37.4 g (1.53 mole) of magnesium and 351 g (1.52 mole) of dimethylhydrosilyl p-bromophenol ester in 600 ml of tetrahydrofuran there is obtained 176 g (72 percent) of p-dimethylhydroxyphenol having a boiling point of 86.5°-87°C at 2.5 mm Hg (the melting point is 36.5°-37°).

Placed into a flask is 2 g of nickel powder and 10 ml of water and to this mixture is dropped 15.2 g (0.1 mole) of p-dimethylhydrosilylphenol in 15 ml of tetrahydrofuran for 30–40 minutes. When the evolution of hydrogen is completed, the reaction mass is filtered out and washed in 10 ml of tetrahydrofuran. The solvent is distilled off and the residue is distilled on a water bath at a temperature of 57°C and a negative pressure of 2 mm Hg to constant weight. 12.6 g (79 percent) of the target product is obtained which after recrystallization has a melting point of 54°–56°C. The product consists of 1,3 bis-(p-hydroxyphenyl) tetramethyldisiloxane of the formula

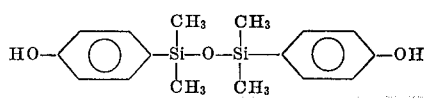

EXAMPLE 3

Placed into a two-necked flask is 2.5 g of calcium hydroxide and 30 ml of absolute ethyl alcohol. Added dropwise to the above mixture over a period of 30 minutes is 15.2 g (0.1 mole) of o-dimethylhydrosilylphenol obtained as described in Example 2. When the evolution of hydrogen is complete, the reaction mass is boiled for 30 minutes, the alcohol is distilled off and the residue is distilled at a temperature of 90°C and a negative pressure of 1 mm Hg. This results in producing 14.2 g (73.9 percent) of o-ethoxydimethylsilylphenol having a melting point of 22°–22.5°C, of the general formula

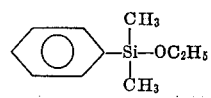

Placed into a 50 ml beaker is 9.7 g (0.05 mole) of o-ehoxydimethylsilylphenol and, while stirring, into the same beaker is poured 20 ml of water heated to 50°C. On cooling the reaction mass, white crystals precipitate which are filtered out. After recrystallization from the solvent consisting of 1 part by weight of diethyl ether and 4 parts by weight of n-hexane there is obtained 7.8 g (87 percent) of o-dimethylhydroxysilylphenol having a melting point of 22°–22.5°C, and having the general formula

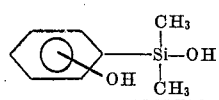

Found, percent: H, 8.22; 8.08; C, 61.25; 61.24; Si, 14.43; 13.94; OH, 8.52; 9.11.

Calculated, percent: H, 8.22; C, 61.17; Si, 14.30; OH, 8.8.

Placed into a Fisher apparatus is 7.8 g (0.1 mole) of o-dimethylhydroxysilylphenol which is kept for 2 hours over phosphorus pentoxide at a negative pressure of 2 mm Hg and a temperature of 56°C. In this case there is obtained a transparent colorless oily liquid which, when cooled, is crystallized. This results in producing 15 g (95 percent) of 1,3 bis-(o-hydroxyphenyl) tetramethyldisiloxane having a melting point of 32°–33.5°C.

Found, percent: C, 60.57; 60.19; H, 6.99; 7.01; Si, 17.40; 17.55; OH, 11.01; molecular weight, 320.

Calculated, percent: C, 60.33; H, 6.99; Si, 17.63; OH, 11.17; molecular weight, 318.

EXAMPLE 4

By using the technique described in Example 2, p-dimethylhydrosilylphenol is obtained. By using the technique described in Example 3, when reacting 22.8 g (0.15 mole) of p-dimethylhydrosilylphenol with 45 g of absolute alcohol in the presence of 3 g of triethylamine, there is produced 25.2 g (87.8 percent) of p-ethoxydimethylsilylphenol having a melting point of 47°–48°C. 19.4 g of this compound is placed in a beaker and treated with 20 ml of water at a temperature of 50°C. The resulting substance is recrystallized from the solvent consisting of 1 part by weight of diethyl ether and 4 parts by weight of n-hexane. As a result, there is obtained 15.1 g (89.8 percent) of p-dimethylhydroxysilylphenol having a melting point of 103°–105°C, 8.4 g (0.05 mole) of the obtained compound is placed into a Fisher apparatus and is kept therein for 2 hours over sulfuric acid at a negative pressure of 2 mm Hg and a temperature of 50°–60°C, thereby obtaining a transparent colorless liquid crystallizing upon cooling. This produces 7.8 g (97 percent) of 1,3 bis-(p-hydroxyphenyl) tetramethyldisiloxane having a melting point of 54°–56.5°C.

Found, percent: C, 60.80; 60.51; H, 6.88; 6.90, Si, 17.76, 18.00; OH, 11.22, 11.37, molecular weight, 314.

Calculated, percent: C, 60.33; H, 6.99; Si, 17.63; OH, 11.17; molecular weight, 318.

We claim:

1. A 1,3 bis-(hydroxyphenyl) of tetraorganodisiloxane of the general formula

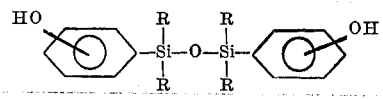

where R is alkyl.

2. A method of producing a 1,3 bis-(hydroxyphenyl) tetra-organodisiloxane of the general formula

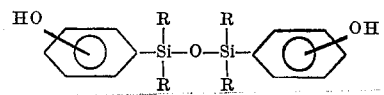

where R is alkyl,
comprising reacting a diorganohydrosilyl halophenol ester with magnesium in an organic solvent medium, distilling off the solvent, heating the reaction mixture to a temperature of 150°–180°C, treating the mixture with a 10–15 percent solution of mineral acid, isolating a diorganohydrosilyl-substituted phenol of the general formula

where R is alkyl, hydrolyzing said phenol in the presence of a catalyst selected from the group consisting of powdered copper, powdered nickel powdered iron, organic bases, and inorganic bases, and condensing the diorganohydroxysilylphenol under a vacuum at a temperature of 35°–60°C and a negative pressure of 1–2 mm Hg.

3. A method as claimed in claim 2, in which the condensation of the diorganohydroxysilylphenols is effected in the presence of a water absorbing agent.

4. A method of producing a 1,3 bis-(hydroxyphenyl) tetraorganodisiloxane of the general formula

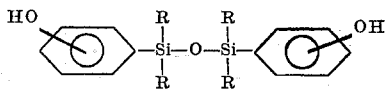

where R is alkyl,
which comprises reacting a diorganohydrosilyl halophenol ester with magnesium in an organic solvent medium, distilling off the solvent, heating the reaction mixture to a temperature of 150°–180 °C, treating the mixture with a 10–15 percent solution of mineral acid, isolating a diorganohydrosilyl-substituted phenol of the general formula

where R is alkyl,
subjecting said phenol to alcoholysis in the presence of a catalyst selected from the group consisting of powdered copper, powdered nickel, powdered iron, organic bases and inorganic bases, hydrolyzing the product to form a diorganohydroxysilylphenol and condensing said diorganohydroxysilylphenol under a vacuum at a temperature of 35°–60C and a negative pressure of 1–2 mm Hg.

5. A method as claimed in claim 4, in which the condensation of the diorganohydroxysilylphenol is effected in the presence of a water absorbing agent.

* * * * *